United States Patent
Hinton et al.

(10) Patent No.: US 11,144,338 B2
(45) Date of Patent: Oct. 12, 2021

(54) COMPUTING SYSTEM FOR MACRO GENERATION, MODIFICATION, VERIFICATION, AND EXECUTION

(71) Applicant: Hyland Software, Inc., Westlake, OH (US)

(72) Inventors: Edward Hinton, Dover, NH (US); Frank Pulito, Berlin, MA (US); Greg Giannone, Ayer, MA (US); Jonathan Ferrin, Derry, NH (US); Zachary Chupka, Pelham, NH (US)

(73) Assignee: HYLAND SOFTWARE, INC., Westlake, OH (US)

( * ) Notice: Subject to any disclaimer, the term of this patent is extended or adjusted under 35 U.S.C. 154(b) by 106 days.

(21) Appl. No.: 16/545,628

(22) Filed: Aug. 20, 2019

(65) Prior Publication Data

US 2021/0055943 A1 Feb. 25, 2021

(51) Int. Cl.
*G06F 9/44* (2018.01)
*G06F 8/35* (2018.01)
(Continued)

(52) U.S. Cl.
CPC .......... *G06F 9/45512* (2013.01); *G06F 3/023* (2013.01); *G06F 9/448* (2018.02);
(Continued)

(58) Field of Classification Search
CPC ...... G06F 9/45512; G06F 9/448; G06F 9/544; G06F 9/541; G06F 9/542; G06F 9/451;
(Continued)

(56) References Cited

U.S. PATENT DOCUMENTS 5,873,064 A * 2/1999 De Armas .............. G06F 3/16
 704/275
5,920,841 A * 7/1999 Schottmuller ........... G06F 3/16
 704/275

(Continued)

OTHER PUBLICATIONS

Ashwath Ganeshan, Performance Modeling of Data Intensive Applications Using SystemC, Oct. 2015, [Retrieved on May 11, 2021], Retrieved from the internet: <URL: https://pure.tue.nl/ws/files/46916496/840129-1.pdf> 86 pp. 1-86 (Year: 2015).*

*Primary Examiner* — Anibal Rivera
(74) *Attorney, Agent, or Firm* — Medley, Behrens & Lewis, LLC (57) ABSTRACT

An automation application is described herein. The automation application executes on a computing device and accesses a macro for a target application. The macro has been generated based upon a sequence of inputs from a user received by the target application that causes the target application to perform an action, screen states of the target application as the target application receives the sequence of inputs from the user, operating system processes that are performed by an operating system as the target application receive the sequence of inputs from the user, and evidence events representing information obtained from the operating system processes. The automation application executes the macro, wherein executing the macro causes the automation application to mimic the sequence of inputs to the target application, thereby causing the target application to perform the action.

20 Claims, 6 Drawing Sheets

(51) Int. Cl.
| | |
|---|---|
| *G06F 3/00* | (2006.01) |
| *G06F 9/455* | (2018.01) |
| *G06F 3/023* | (2006.01) |
| *G06F 9/448* | (2018.01) |
| *G06F 9/54* | (2006.01) |
| *G06F 3/0346* | (2013.01) |
| *G06F 3/0489* | (2013.01) |

(52) U.S. Cl.
CPC ............ *G06F 9/544* (2013.01); *G06F 3/0346* (2013.01); *G06F 3/04895* (2013.01); *G06F 9/455* (2013.01); *G06F 9/541* (2013.01); *G06F 9/542* (2013.01)

(58) Field of Classification Search
CPC ........ G06F 9/4843; G06F 9/455; G06F 3/023; G06F 3/0237; G06F 3/04886; G06F 3/04895; G06F 3/0346; G06F 3/16; G06F 3/48; G06F 3/03543; G06F 3/011; G06F 11/3688; G06F 11/3672; G06F 11/3696; G06F 11/3664; G06F 11/3414
See application file for complete search history.

(56) References Cited

U.S. PATENT DOCUMENTS

| | | | | |
|---|---|---|---|---|
| 6,088,712 | A * | 7/2000 | Huang | G06F 9/45512 715/201 |
| 6,101,461 | A * | 8/2000 | Ukigawa | G06F 3/0237 704/10 |
| 6,184,880 | B1 * | 2/2001 | Okada | G06F 9/45512 714/E11.217 |
| 6,336,149 | B1 * | 1/2002 | Preston | G06F 3/023 710/1 |
| 6,386,980 | B1 * | 5/2002 | Nishino | A63F 13/10 463/43 |
| 7,299,451 | B2 * | 11/2007 | Dygon | G06F 11/3664 714/E11.208 |
| 7,398,469 | B2 * | 7/2008 | Kisamore | G06F 11/3688 715/704 |
| 7,437,715 | B2 * | 10/2008 | Chatsinchai | G06F 9/451 717/127 |
| 7,529,977 | B2 | 5/2009 | Arvathy et al. | |
| 7,644,367 | B2 * | 1/2010 | McKeon | H04N 21/8543 715/762 |
| 8,060,791 | B2 * | 11/2011 | Hayutin | G06F 11/3696 714/46 |
| 9,130,975 | B2 * | 9/2015 | Chou | H04L 67/02 |
| 9,983,859 | B2 * | 5/2018 | Mascaro | G06N 5/022 |
| 10,558,769 | B2 * | 2/2020 | Dembo | G06N 5/025 |
| 2003/0191729 | A1 * | 10/2003 | Siak | G06F 16/9535 706/45 |
| 2004/0133878 | A1 * | 7/2004 | Cole | G06F 8/51 717/115 |
| 2005/0278728 | A1 * | 12/2005 | Klementiev | G06F 11/3414 719/328 |
| 2006/0005132 | A1 * | 1/2006 | Herdeg, III | G06F 9/45512 715/704 |
| 2006/0044587 | A1 * | 3/2006 | Yoshida | H04N 1/00474 358/1.13 |
| 2006/0150120 | A1 * | 7/2006 | Dresti | G08C 23/04 715/810 |
| 2006/0205435 | A1 * | 9/2006 | Lee | H04M 1/72403 455/558 |
| 2006/0282453 | A1 * | 12/2006 | Tjong | G06F 8/42 |
| 2007/0006179 | A1 * | 1/2007 | Tjong | G06F 8/51 717/136 |
| 2007/0006196 | A1 * | 1/2007 | Tjong | G06F 8/51 717/151 |
| 2007/0294586 | A1 * | 12/2007 | Parvathy | G06F 11/3672 714/38.14 |
| 2008/0282065 | A1 * | 11/2008 | Imamichi | G06F 9/4843 712/208 |
| 2008/0301094 | A1 * | 12/2008 | Zhu | G06F 16/34 |
| 2009/0133000 | A1 * | 5/2009 | Sweis | G06F 11/3688 717/124 |
| 2009/0144621 | A1 * | 6/2009 | Sangster | G06F 3/03543 715/704 |
| 2009/0270121 | A1 * | 10/2009 | Soejima | G06F 9/45512 455/550.1 |
| 2009/0300529 | A1 * | 12/2009 | Endoh | G06F 9/451 715/764 |
| 2010/0017693 | A1 * | 1/2010 | Keohane | G06F 40/166 715/201 |
| 2010/0269041 | A1 * | 10/2010 | Kintzley | G06F 9/45512 715/704 |
| 2011/0009192 | A1 * | 1/2011 | Aronzon | G06F 3/0484 463/36 |
| 2011/0021269 | A1 * | 1/2011 | Wolff-Peterson | A63F 13/85 463/29 |
| 2011/0040824 | A1 * | 2/2011 | Harm | G06F 9/45529 709/203 |
| 2011/0041140 | A1 * | 2/2011 | Harm | G06F 9/445 719/318 |
| 2011/0041141 | A1 * | 2/2011 | Harm | G06F 9/541 719/318 |
| 2011/0065509 | A1 * | 3/2011 | Rom | A63F 13/22 463/37 |
| 2011/0244961 | A1 * | 10/2011 | Soelberg | G06F 3/023 463/32 |
| 2011/0302499 | A1 * | 12/2011 | Chou | H04L 67/02 715/738 |
| 2012/0089931 | A1 * | 4/2012 | Steinhauer | G06F 9/451 715/764 |
| 2013/0067497 | A1 * | 3/2013 | Seo | G06F 3/0346 719/318 |
| 2013/0196765 | A1 * | 8/2013 | Wolff-Petersen | A63F 13/21 463/36 |
| 2013/0205206 | A1 * | 8/2013 | Hawver | A63F 13/10 715/704 |
| 2014/0198344 | A1 * | 7/2014 | Hirata | H04N 1/00411 358/1.15 |
| 2015/0067701 | A1 * | 3/2015 | VanBlon | G06F 9/451 719/312 |
| 2016/0231870 | A1 * | 8/2016 | Summa | G06F 9/542 |
| 2017/0315791 | A1 * | 11/2017 | Mascaro | G06F 8/20 |
| 2018/0121215 | A1 * | 5/2018 | Charbonneau | G16H 40/67 |
| 2018/0165610 | A1 * | 6/2018 | Dumant | G06F 40/47 |
| 2018/0321949 | A1 * | 11/2018 | Bikumala | G06F 3/04886 |
| 2018/0321950 | A1 * | 11/2018 | Bikumala | G06F 9/451 |
| 2018/0339225 | A1 * | 11/2018 | Chen | G06F 1/1652 |
| 2019/0196795 | A1 * | 6/2019 | Cavalier | G06F 9/45512 |
| 2019/0197206 | A1 * | 6/2019 | Dembo | G06N 5/025 |
| 2020/0319856 | A1 * | 10/2020 | Loria | G06F 3/017 |

* cited by examiner

COMPUTING SYSTEM FOR MACRO GENERATION, MODIFICATION, VERIFICATION, AND EXECUTION

FIELD

This disclosure relates to macro generation and execution.

BACKGROUND

Computer-executable applications perform actions (e.g., generating data, modifying data, transmitting data, and/or retrieving data from data sources) based upon mechanisms configured by developers of the applications. In an example, an application may include support for a display and input devices such as a keyboard and a mouse. The application may present a graphical user interface (GUI) on the display that depicts parameters for actions that can be performed by the application. A user of the application may view the parameters within the GUI. The application may receive input by way of the input devices, and the application may perform the actions based upon the input. Alternatively, the application may cause another application to perform the actions based upon the input.

In another example, the application may be configured to perform actions by way of application programming interfaces (APIs). An API enables the application to perform actions via programmatic calls that are received by the application. Alternatively, the API may enable the application to cause another application to perform the actions via the programmatic calls.

In certain scenarios, an application may not be configured with a publicly accessible API or may lack an API entirely. In other scenarios, the application may be configured with a publicly accessible API, but a user of the application may not have the requisite programming knowledge to utilize the publicly accessible API. In these scenarios, the application typically receives manual input from a user to operate, which can be burdensome, subject to errors, and sacrifice functionality. In order to address this problem, several conventional approaches have been developed.

A conventional approach to the above-referenced problem is to generate macros for an application via conventional macro recorders. In general, conventional macro recorders are configured to record a sequence of inputs (e.g., keystrokes and/or mouse clicks) received by the application from a user. A computing device may then later execute the conventional macro to mimic the sequence of inputs to the application, thereby causing the application to perform an action. In an example, the sequence of inputs may cause the application to retrieve data from a data source or to generate new data based upon the data retrieved from the data source.

Another conventional approach to the above-referenced problem is to employ specialized programmer tools. Specialized programmer tools tend to provide a traditional programming language or a text-based scripting language that has similarities with a traditional programming language. Specialized programmer tools tend to require analytical, development, and testing techniques that are employed by persons with programming knowledge.

The aforementioned conventional approaches suffer from various deficiencies. First, conventional macro recorders that generate conventional macros for an application tend not to have the ability to make complex decisions based on feedback from the application (or feedback from another application). Thus, conventional macro recorders are limited to performing simple, repetitive tasks that function in an identical manner each time the tasks are performed. If anything changes in the application version or user interface, the conventional macro becomes useless and could even accidentally execute actions in error causing the user to suffer economic losses or embarrassment. Second, conventional macros tend to be tied to characteristics of the computing device on which they are recorded and hence can be challenging to port to computing devices with different characteristics. Third, specialized programmer tools are not meant to be used by users who are not programmers and thus cannot be readily used by users that lack programming knowledge.

SUMMARY

The following is a brief summary of subject matter that is described in greater detail herein. This summary is not intended to be limiting as to the scope of the claims.

A computing device executes a target application and an automation application. The automation application accesses a macro for the target application. The macro has been generated based upon: a sequence of inputs from a user received by the target application that causes the target application to perform an action, screen states of the target application as the target application receives the sequence of inputs from the user, operating system processes that are performed by an operating system as the target application receives the sequence of inputs from the user, and evidence events representing information obtained from the operating system processes. The automation application executes the macro, which causes the automation application to mimic the sequence of inputs to the target application, thereby causing the target application to perform the action.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to macro generation and execution are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Systems and methods are disclosed herein provide a robust macro tool for users that do not have specialized programming knowledge, but still achieve high levels of interaction and functionality to interface multiple applications, or gather or supply data to applications, even for applications without an application programming interface. As such the systems and method disclosed herein fundamentally alter the nature of programming interactions with the user interface to provide high levels of automation and functionality. In particular, these systems and methods alter the nature of programming interactions between an enterprise content management system and a line of business application (i.e., a target application) interacting through the user interface of the line of business application, including, for example, web-based business applications.

As used herein, the term "macro" refers to a series of computer-executable instructions that, when executed by a processor of a computing device, cause the computing device to mimic a sequence of inputs to the computing device.

Figure 1:
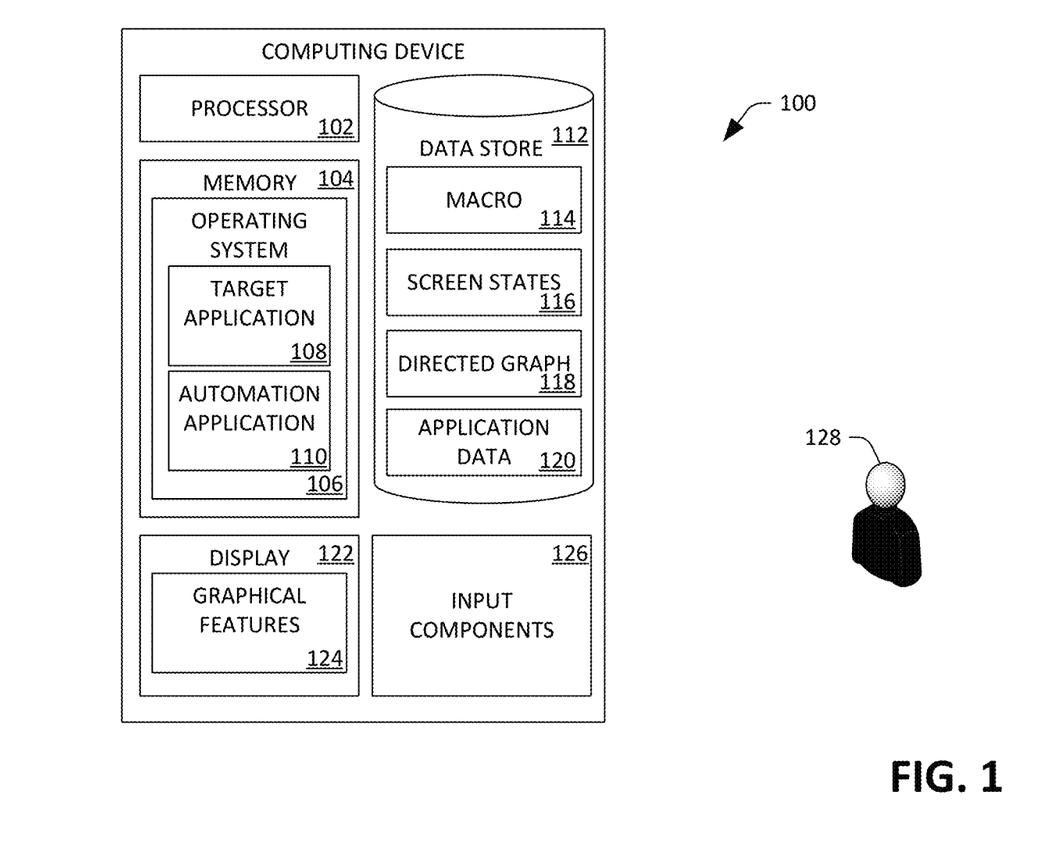
FIG. 1 is a functional block diagram of an exemplary computing device.

With reference to FIG. 1, an exemplary computing device 100 is illustrated. The computing device 100 is operated by a user 128. The user 128 may lack computer-programming knowledge. In an example, the computing device 100 may be a desktop computing device, a laptop computing device, a tablet computing device, a smartphone, or a gaming console. The computing device 100 includes a processor 102 and memory 104, wherein the memory 104 has an operating system 106, a target application 108, and an automation application 110 loaded therein.

The operating system 106 (when executed by the processor 102) provides an interface between applications stored in the memory 104 (e.g., the target application 108 and the automation application 110) and hardware resources of the computing device 100. In an embodiment, the computing device 100 may execute the operating system 106 in a virtual machine environment.

The target application 108 (when executed by the processor 102) is generally configured to perform actions based in part upon input by the user 128. Alternatively, the target application 108 may perform the actions based in part upon input that is mimicked by the automation application 110. An action in the actions may include generating data, modifying data, exchanging data with another application executing on the computing device 100, transmitting data to a second computing device, receiving data from the second computing device, or combinations thereof. The action may also include causing the second computing device to generate data, modify data, transmit data, receive data, exchange data between different applications executing on the second computing device, or combinations thereof. In order to facilitate performing the actions, the target application 108 is configured to present a graphical user interface (GUI) to the user 128. In an embodiment, the target application 108 may be a web application that is presented within a browser that executes on the computing device 100.

In an embodiment, the target application 108 may be a distributed application. In the embodiment, the target application 108 performs client-side functionality, while a server application that executes on a server computing device performs server-side functionality. The target application 108 and the server application communicate with one another in order to perform actions. In an embodiment, the computing device 100 may execute the target application 108 in a virtual machine environment.

As will be described in greater detail below, the automation application 110 (when executed by the processor 102) is configured to generate macros for the target application 108 (herein referred to as recording mode). The automation application 110 is also configured to execute the macros for the target application 108 in order to cause the target application 108 to perform actions (herein referred to as execution mode). Furthermore, the automation application 110 may be configured to present a GUI that enables the user 128 to visualize sequences of inputs defined by the macros (in the form of a directed graph) and to make modifications to the macros (herein referred to as modification mode). Additionally, the automation application 110 may be configured to present a GUI that enables the user 128 to verify that each input in the sequence of inputs is correctly executed and that the macro is performing its intended functionality (herein referred to as verification mode). In an embodiment, the computing device 100 may execute the automation application 110 in a virtual machine environment.

In an embodiment, the recording mode, the execution mode, the modification mode, and the verification mode may be performed by separate applications (i.e., a recording application, an execution application, a modification application, and a verification application). Moreover, not all of the applications need be installed on the same computing device. For instance, the computing device 100 which generates a macro may have the recording application, the execution application, the modification application, and the verification application installed, but a second computing device that is to execute the macro may have only the execution application installed.

The computing device 100 may additionally comprise a data store 112. The data store 112 may comprise a macro 114 that is generated by the automation application 110. In an embodiment, the macro 114 may be stored as an Extensible Markup Language (XML) file. The data store 112 may also comprise screen states 116 of the target application 108 that are captured by the automation application 110. The automation application 110 may utilize the screen states 116 in generating the macro 114. The data store 112 may comprise a directed graph 118 that is assigned to the macro. The macro 114, the screen states 116, and the directed graph 118 are described in greater detail below. Additionally, the data store 112 may comprise application data 120 that is generated, modified, transmitted, or received by the target application 108 when the target application 108 performs an action. Although the macro 114, the screen states 116, the directed graph 118, and the application data 120 are described as being retained in the data store 112, it is to be understood that some or all of these elements may be retained in the memory 104 as well.

The computing device 100 further includes a display 122, whereupon graphical features 124 may be presented thereon. In an example, the graphical features 124 may include a GUI for the target application 108. In another example, the graphical features 124 may include a GUI for the automation application 110.

The computing device 100 additionally includes input components 126 that are suitable for data input. The input components 126 may include a mouse, a keyboard, a scroll wheel, a trackpad, a touchscreen, a camera, a video camera, and/or a microphone. As such, examples of input to the computing device 100 may include, but are not limited to, a single click of a mouse button of a mouse, a double click of the mouse button, a drag and drop performed by the mouse (i.e., a depression of the mouse button of the mouse, followed by a drag of the mouse in a direction while the mouse button remains depressed, followed by a release of the mouse button), keyboard strokes captured by a keyboard, rotation of a scroll wheel, movement of a digit (e.g., a finger) of the user 128 across a trackpad or a touchscreen, a depression of the digit on the trackpad or the touchscreen, movements of the user 128 as captured by a camera or a video camera, and/or audible words uttered by the user 128 as captured by a microphone.

Operation of the computing device 100 is now set forth. It is contemplated that a GUI for the target application 108 is presented within a window shown on the display 122. In an embodiment, a GUI for the automation application 110 may be presented on the display 122 as an overlay to the GUI for the target application 108. The automation application 110 may receive an indication from the user 128 indicating that the automation application 110 is to begin recording a sequence of inputs (i.e., one or more inputs) received by the computing device 100 from the user 128. The automation application 110 may capture an initial screen state (described below) of the target application 108 responsive to receiving the indication.

The target application 108 may then receive a sequence of inputs from the user 128 that causes the target application 108 to perform an action (or more than one action). In an example, the target application 108 may receive a first input (e.g., a series of keystrokes corresponding to a word) from the user 128. The target application 108 may then receive a second input (e.g., a mouse-click on a button that causes the target application 108 to transmit the word to another computing device) from the user 128.

The automation application 110 also records the screen states 116 of the target application 108 as each input in the sequence of inputs is received by the target application 108. A screen state in the screen states 116 comprises a screen shot of the target application 108 when (or immediately before) the target application 108 receives an input from the user 128. The screen state may also comprise characteristics of the display 122 on which the GUI for the target application 108 is displayed. The characteristics may include a size of the display 122, a resolution of the display 122 (e.g., 1920 pixels×1080 pixels or 3840 pixels×2160 pixels), and/or an aspect ratio of the display 122 (e.g., 16:9, 16:10, or 21:9). If the target application 108 is not running in a full-screen mode, the screen state may also comprise the same display characteristics for the reduced-size display (window). The screen state may also comprise accessibility characteristics of the operating system 106, such as a font size or font type in which text is presented within the GUI for the target application 108. Font size or type can improve resilience in identifying positions and bounding boxes if these attributes differ at recording time versus execution time. In the example above, the automation application 110 may capture a first screen state of the target application 108 immediately prior to the first input being received by the target application 108 and a second screen state of the target application 108 immediately prior to the second input being received by the target application 108. The screen shot is a captured image of the visual representation of a relevant window or collection of windows that are being displayed by the target application 108. The automation application 110 records the screen shots at precise moments to be merged with the (recorded) sequence of inputs input and/or operating system processes. The screen shot is timed to provide a well-defined one-to-one correlation between the visual display (i.e., GUI) the user 128 is familiar with and the precise moment when the input should be performed. The screenshot deterministically provides a visual state of the target application 108 at the point immediately prior to the user initiated input. In an embodiment, the automation application 110 may capture transition screen states that the target application 108 displays between receiving the first input and the second input.

The automation application 110 also records positions at which the sequence of inputs is received by the target application 108. More specifically, the automation application 110 may record the positions with respect to the display 122 (i.e., an input was received at a pixel (or a collection of pixels) on the display 122). The automation application 110 may also record the positions with respect to the window in which the GUI for target application 108 is displayed. In the example above, the automation application 110 may record that the first input was received at a first position in the window of the target application 108 and that the second input was received at a second position in the window of the target application 108.

It is understood that some inputs received by the target application 108 may cause a child window (or several child windows) to be presented on the display 122 in addition to the window (i.e., a parent window) for the target application 108. The child window may be presented as an overlay to the parent window for the target application 108 or side-by-side to the parent window for the target application 108. The automation application 110 may determine a position of the child window on the display 122. The automation application 110 may also determine the position of the child window relative to a position of the parent window on the display 122.

The automation application 110 also records operating system processes that are performed by the operating system 106 as the target application 108 receives each input in the sequence of inputs from the user 128. For example, the operating system processes may include operating system hook functions (i.e., operating system functions that intercept events that occur within the target application 108), operating system message events (i.e., messages passed by the operating system 106 to a window of the target application 108 as the target application 108 receives the sequence of inputs), operating system automation processes, multiple document interface (MDI) child window activations, and/or command line emulation protocol responses.

The operating system processes may also include keystroke events intercepted (i.e., hooked) by the operating system 106, mouse events intercepted by the operating system 106, output methods contained in shared libraries (e.g., Dynamic-link libraries (DLLs)) that are used to write output to a display and that are intercepted by the operating system 106, such as text output routines, drawing routines, and positioning routines such as bit block transfer (BitBlt) operations, appearance of windows of the target application 108 that are intercepted by the operating system 106, message streams of the target application 108 that are intercepted by the operating system 106, and/or callback mechanisms for terminal emulation or third party libraries that are intercepted by the operating system 106.

In an embodiment, the automation application 110 may record the sequence of inputs, the screen states, and the operating system processes using Transmission Control Protocol (TCP)/Internet Protocol (IP) socket communications, named pipes, shared memory, persistently stored file logs, and/or direct method calls and event callbacks linked to the automation application 110.

The automation application 110 may also record evidence events that represent information obtained from the operating system processes. The evidence events may also be performed by the target application 108 and may provide feedback to the user 128. For instance, the evidence events may include text being written to a GUI of the target application 108 (or another application), device context content being copied to a different device context, activation (i.e., opening) of a window by the operating system 106, deactivation (i.e., closing) of a window of the operating system 106, positioning data indicating a change of position of an element (e.g., a control) of the GUI, text representing an internal name of an element of the GUI, text, names, positioning, and type information of operating system interface controls being presented to the user 128, text available from an emulation protocol response, and/or a second application being executed by the computing device 100. The evidence events may include information that is visible or invisible to the user 128 and may occupy distinct or co-incident locations on the display 122. The evidence events (that may originate from multiple distinct operating system processes) may be collected and merged into a stream of evidence events (without requiring the user 128 to have knowledge of the origin of each evidence event). An evidence event in the evidence events may include multiple properties that are associated with the evidence event. For instance, an evidence event corresponding to representing text written to the display 122 may include the text, a bounding box of the text, and a window within which the text was written.

The automation application 110 records each input in the sequence of inputs as each input is received by the target application 108. The automation application 110 may record a timestamp when each input is received by the target application 108. For instance, when an input in the sequence of inputs is received by the target application 108, the automation application 110 may record a timestamp and assign the timestamp to the input, a screen state of the target application 108 when the target application 108 receives the input, operating system processes performed by the operating system 106 when the target application 108 receives the input, and evidence events occurring when the target application 108 receives the input. The automation application 110 may utilize the timestamps in generating the macro 114. In the example above, the automation application 110 may record a first timestamp when the first input is received by the target application 108 and a second timestamp when the second input is received by the target application 108. The automation application 110 may assign the first timestamp to the first input (and its corresponding screen state, operating system processes, and evidence events) and the second timestamp to the second input (and its corresponding screen state, operating system processes, and evidence events). It is to be understood that the operating system processes may be performed in a manner such that an order in which the evidence events come into existence may not correspond to the order in which the operating system processes are performed. Thus, the automation application 110 may utilize the first timestamp and the second timestamp in order to ensure that the macro (when generated) performs actions in the correct order. Additionally, the automation application 110 may also use the first timestamp and the second timestamp to resolve conflicting evidence events on a GUI for the target application 108.

In an embodiment, the automation application 110 may receive a first indication from the user 128 that macro recording is to be paused. Responsive to receiving the first indication, the automation application 110 may pause recording of the macro (i.e., the automation application 110 temporarily ceases recording inputs, screen states, operating system processes, and evidence events). When the user 128 wishes to resume recording of the macro, the automation application 110 may receive a second indication from the user 128 that macro recording is to resume. Responsive to receiving the second indication, the automation application 110 may resume recording the macro.

When the user 128 wishes to end recording of the macro, the automation application 110 may receive an indication from the user 128 that the automation application 110 is to cease recording of the macro (i.e., the automation application 110 is to cease recording inputs, screen states, operating system processes, and evidence events). The automation application 110 may capture a screen state of the target application 108 responsive to receiving the indication.

The automation application 110 may then generate the macro based upon each input in the sequence of inputs received by the target application 108, the screen states of the target application 108 as the target application 108 received each input in the sequence of inputs, the operating system processes performed by the operating system 106 as the target application 108 received each input in the sequence of inputs, and the evidence events. More specifically, the automation application 110 may generate the macro concurrently with or subsequent to recording the sequence of inputs, the screen states, the operating system processes, and the evidence events. More specifically, the automation application 110 may generate a series of computer-executable instructions that, when executed by the automation application 110, cause the automation application 110 to mimic the sequence of inputs to the target application 108 without manual input of the user 128. The macro includes criteria upon which the automation application 110 mimics the sequence of inputs. The criteria include prior input in the sequence of inputs being mimicked in the correct order, screen states of the target application 108 as the target application 108 receives mimicked input from the automation application 110, operating system processes performed by the operating system 106 when the target application 108 receives the mimicked input from the automation application 110, and evidence events representing information obtained from the operating system 106 when the target application 108 receives the mimicked input from the automation application 110.

In an embodiment, the automation application 110 may generate the directed graph 118 based upon the sequence of inputs received by the target application 108, the screen states of the target application 108 as the target application 108 received the sequence of inputs, and operating system processes performed by the operating system 106 as the target application 108 received the input. The automation application 110 may also generate the directed graph based upon the evidence events described above. The automation application 110 may then generate the macro based upon the directed graph 118. It is to be understood that the directed graph 118 (or portions thereof), the screen states 116 (or portions thereof), indications of the operating system processes (or portions thereof), and indications of the evidence events (or portions thereof) may be included in the macro.

The directed graph 118 comprises nodes and directed edges. A first subset of the nodes is assigned to the sequence of inputs. In the example above, a first node in the first subset may be assigned to the first input and a second node in the first subset may be assigned to the second input. A second subset of the nodes may be assigned to potential inputs to the target application 108 that were not received by the target application 108 when the automation application 110 recorded the sequence of inputs from the user 128. The automation application 110 may identify the potential inputs based upon the screen states of the target application 108. In an embodiment, the automation application 110 may also identify the potential inputs based upon historical activity with respect to the target application 108.

The directed edges connect the first subset of the nodes, wherein a connection between nodes indicates an ordering of the input. In the example above, a directed edge may originate from the first node and may terminate in the second node to indicate that the first input was received by the target application 108 immediately before the second input was received by the target application 108. Hence, when the automation application 110 executes the macro, the automation application 110 mimics the first input to the target application 108 prior to mimicking the second input to the target application 108.

In an embodiment, the automation application 110 may assign each directed edge criteria that are to be satisfied in order for the automation application 110 to traverse each directed edge. It is to be understood that some directed edges may not be assigned criteria (i.e., the criteria is empty). Moreover, it is also to be understood that the criteria need not be mutually exclusive. The criteria are based upon the sequence of inputs, the screen states 116 of the target application 108 as the target application 108 receives the sequence of inputs, operating system processes that are performed by the operating system 106 as the target application 108 receives the sequence of inputs, and evidence events representing information obtained by the operating system processes. For instance, the criteria may include evaluating text located in a screen state against a constant text value, evaluating a position of the text in the screen state against a constant set of coordinates in the screen state, evaluating the position of the text in the screen state against a variable set of coordinates in the screen state, evaluating the text in the screen state against a data element (i.e., data passed into the macro or data originated from a prior screen state), evaluating the text in the screen state against an expression, evaluating the text in the screen state against second text in a prior screen state, and/or evaluating the text in the screen state against second text located in the screen state.

In an embodiment, the automation application 110 may cause a visual representation of the directed graph 118 to be presented on the display 122 subsequent to generation of the directed graph 118. The automation application 110 may receive a modification to the directed graph 118 from the user 128. In an example, the modification may cause a node to be added or deleted from the directed graph 118. In another example, the modification may cause a directed edge to originate and/or terminate from/into a different node in the directed graph 118. In yet another example, the modification may cause a directed edge to be added or deleted from the directed graph 118. The modification may be indicative of a second sequence of inputs that is different from the first sequence of inputs. The second sequence of inputs may cause the target application 108 to perform a second action when mimicked by the automation application 110 to the target application 108. The automation application 110 may then generate a modified macro based upon the modification to the directed graph 118, wherein the modified macro, when executed by the automation application 110, causes the target application 108 to perform the second action.

In an embodiment, the automation application 110 may be configured to generate macros with conditional branching using the directed graph 118. The automation application 110 may receive a selection of a node (referred to herein as a branching node) in the directed graph 118 from the user 128. The automation application 110 may also receive an indication from the user 128 that the automation application 110 is to begin recording a second sequence of inputs to the target application 108 from the user 128 (as well as screen states, operating system processes, and evidence events) starting from an input in the sequence of inputs corresponding to the branching node. Responsive to receiving the indication, the automation application 110 may begin to record the second sequence of inputs, screen states corresponding to the second sequence of inputs, operating system processes, and evidence events corresponding to the second sequence of inputs in a manner similar to that described above. The automation application 110 may then modify the directed graph 118 to include nodes and directed edges corresponding to the second sequence of inputs. The automation application 110 may also receive user-defined criteria from the user 128 that are to be assigned to a directed edge that connects the branch node to a first node that is assigned to a first input in the second sequence of inputs. When the automation application 110 executes the macro and mimics an input to the target application 108 corresponding to the branch node, the automation application 110 may utilize the user-defined criteria (in addition to the criteria described above) in determining whether the automation application 110 is to mimic inputs corresponding to the second sequence of inputs or whether the automation application 110 is to continue mimicking inputs corresponding to the (original) sequence of inputs.

The automation application 110 may also provide for verification functionality to ensure that the macro, when executed by the automation application 110, performs its intended functionality. The automation application 110 may present a GUI as an overlay to the GUI for the target application 108. The GUI for the automation application 110 may display the directed graph 118. In an embodiment, the directed graph 118 shows a branching set of lines where different user actions are possible, each different action may be shown as a line proceeding on a different trajectory than other actions. The GUI for the automation application 110 enables the user 128 to step through each input in the sequence of inputs of the macro. In the example above, the automation application 110 may mimic the first input to the target application 108. The automation application 110 may then pause execution of the macro such that the user 128 may visually inspect the GUI for the target application 108 to ensure that the automation application 110 properly mimicked the first input and/or the first input performed its intended purpose. Responsive to receiving an indication from the user 128, the automation application 110 may then mimic the second input and pause execution of the macro such that the user 128 may once again visually inspect the GUI for the target application 108 to ensure that the automation application 110 properly mimicked the second input and/or the second input performed its intended purpose. The automation application 110 may repeat this process for each input in the sequence of inputs in the macro.

The automation application 110 may store the macro in the data store 112 (e.g., as the macro 114). Additionally, or alternatively, the automation application 110 may also cause the macro to be transmitted over a network to a second computing device (not shown), whereupon the second computing device may execute the macro.

Subsequent to generating the macro, the automation application 110 may execute the macro. In an example, the automation application 110 may execute the macro responsive to receiving an indication from the user 128. In another example, the automation application 110 may automatically execute the macro at a predefined time interval (e.g., once a day, once an hour). In yet another example, the automation application 110 may execute the macro responsive to receiving a request from another application executing on the computing device 100 or executing on another computing device. The automation application 110 may execute the macro as a result of being instructed to do so by another application. Prior to or concurrently with executing the macro, the automation application 110 determines characteristics of the display 122 and accessibility characteristics of the operating system 106 in order to ensure that the macro is correctly executed. More specifically, the automation application 110 compares the characteristics of the display 122 and the accessibility characteristics of the operating system 106 with the criteria included in the macro. When the automation application 110 determines that differences exist between the criteria in the macro and the characteristics of the display 122 and/or the operating system 106 (e.g., the target application 108 has been updated to a different version subsequent to generating the macro or the computing device 100 has been configured with a new display that has different characteristics than the display 122), the automation application 110 may adjust execution of the macro such that the macro performs its intended action despite the differences. For instance, the automation application 110 may adjust positions at which the sequence of inputs is received by the target application 108 in a window of the target application 108 based upon the characteristic of the display 122 and/or the characteristics of the operating system 106. The automation application 110 may also adjust the position and extent of evidence events and operating system processes based upon the differences in characteristics of the display 122.

Executing the macro causes the automation application 110 to mimic the sequence of inputs to the target application 108, thereby causing the target application 108 to perform an action (or more than one action). The automation application 110 may execute the macro in part by traversing the directed graph. The automation application 110 mimics each input in the sequence of inputs to the target application 108 as reflected by nodes (in the first subset) that are connected by directed edges in the directed graph 118. As the automation application 110 mimics each input in the sequence of inputs, the automation application 110 monitors for screen states, operating system processes, and evidence events specified in the macro in order to proceed to mimic subsequent inputs in the sequence of inputs. In the example above, the automation application 110 may mimic the first input to the target application 108. The automation application 110 may then determine whether the criteria assigned to the directed edge connecting the first node to the second node are satisfied. The automation application 110 mimics the second input to the target application 108 when the automation application 110 determines that the criteria are satisfied. For instance, the automation application 110 may mimic the second input to the target application 108 upon determining: that the first input has been received by the target application 108, that the target application 108 is presenting certain screen states on the display 122, that certain operating system processes have performed by the operating system 106, and/or that the automation application 110 has detected that certain evidence events have occurred. Thus, the automation application 110 traverses the directed graph 118 in order to execute the macro.

Although the above-described process has been described as generating a single macro (i.e., the macro 114) for a single application (i.e., the target application 108), it is to be understood that the automation application 110 may generate many different macros for many different applications. Moreover, it is to be understood that a single macro may include instructions for actions that are performed by different applications in addition to actions performed by the target application 108. For instance, the macro may cause the target application 108 to perform an action in addition to causing a second application executing on the computing device 100 to perform a second action. Such, as for example, the macro can direct the operating system to switch windows to a second application while running the macro, and perform actions in both windows for both applications.

Figure 2:
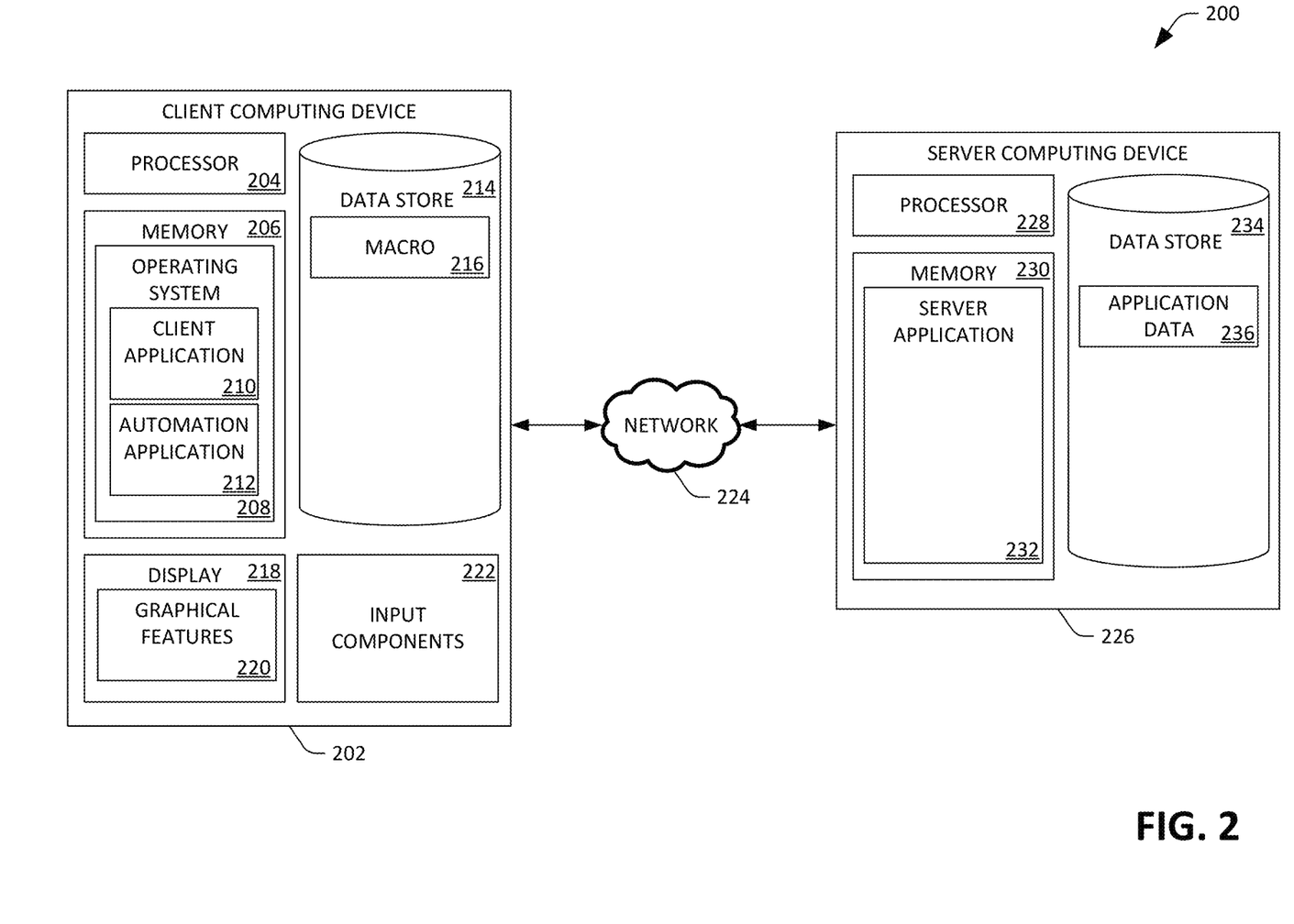
FIG. 2 is a functional block diagram of an exemplary computing system.

Referring now to FIG. 2, an exemplary computing system 200 is illustrated. The computing system 200 includes a client computing device 202. In an embodiment, the client computing device 202 may be or include the computing device 100 described above in FIG. 1. In another embodiment, the client computing device 202 is a separate computing device from the computing device 100. The client computing device 202 may be operated by a user (e.g., the user 128 or another user).

The client computing device 202 comprises a processor 204 and memory 206, wherein the memory 206 has an operating system 208, a client application 210, and an automation application 212 loaded therein. The operating system 208 (when executed by the processor 204) provides an interface between applications stored in the memory 206 (e.g., the client application 210 and the automation application 212) and hardware resources of the client computing device 202. In an embodiment, the client computing device 202 may execute the operating system 208 in a virtual machine environment.

The client application 210 (when executed by the processor 204) is generally configured to perform actions. The client application 210 may be similar or identical to the target application 108 described above. The automation application 212 may be similar or identical to the automation application 110 described above.

The client computing device 202 may additionally comprise a data store 214. The data store 214 stores a macro 216 that has been generated by the automation application 212 (or another automation application, such as the automation application 110). As described above in the description of FIG. 1, the macro 216 has been generated based upon a sequence of inputs from a user received by the client application 210 (or the target application 108), screen states of the client application 210 (or the target application 108) as the client application 210 (or the target application 108) receives the sequence of inputs, operating system processes performed by the operating system 208 (or the operating system 106) as the client application 210 (or the target application 108) receives the sequence of inputs, and evidence events representing information obtained from the operating system processes. It is to be understood that the macro 216 may also be retained in the memory 206. In an example, the macro 216 may be or include the macro 114 described above. Although not depicted in FIG. 2, the data store 214 may also comprise screen states, directed graphs, and application data similar to that described above in the description of FIG. 1.

The client computing device 202 additionally includes a display 218, whereupon graphical features 220 may be presented thereon. For example, a GUI for the client application 210 and/or a GUI for the automation application 212 may be presented as part of the graphical features 220. The client computing device 202 also includes input components 222. The input components 222 may be similar to identical to the input components 126 described above.

The computing system 200 also includes a server computing device 226. The server computing device 226 is in communication with the client computing device 202 by way of a network 224 (e.g., the Internet, intranet). The server computing device 226 comprises a processor 228 and memory 230, wherein the memory 230 has a server application 232 loaded therein. The server application 232 is generally configured to communicate with the client application 210 in order to perform actions. In an embodiment, the server application 232 may lack a publicly accessible API.

In an embodiment, the client application 210 may be a client Enterprise Content Management (ECM) application and the server application 232 may be a server ECM application (collectively, "the ECM system"). An ECM system may be generally configured to capture, manage, store, preserve, and deliver content and documents related to organizational processes within an organization. The ECM system may be configured with functionality pertaining to document management, web content management, search, collaboration, image management, records management, digital asset management, workflow management, and capture and scanning. The ECM system may provide functionality that enables management of unstructured, semi-structured, and/or structured information. The ECM system may be installed on a network of the organization, may be provided as a software as a service (SaaS) offering, or may be provided as an Infrastructure as a Service (IaaS) offering (i.e., cloud computing).

The ECM system may provide functionality pertaining to web content management, collaborative content management, and/or transactional content management. Web content includes information or documents that reside on internet or cloud-based servers. Web content management includes managements of websites and databases. Web content management also includes enabling content producers to create and publish content (e.g., articles, photo galleries). Web content management also provides for dynamic uploading and editing of the content.

Collaborative content management includes managing documents or content that multiple users have or need to access. Collaborative content management enables documents to be accessed and edited by multiple users simultaneously. For instance, a team of users can work upon a single master document tracking changes, saving minor drafts, and embedding files.

Transactional content management includes functionality pertaining to collection of physical documents that may be transformed into electronic, magnetic, or optically-stored documents. For instance, transactional content management may include managing insurance claims, medical records, government forms, payroll, student admissions, etc. Transactional content management provides an efficient way to maintain and access documents and may provide for efficient integration with many different applications.

In another embodiment, the client application 210 may be a client electronic health records application (EHR) and the server application 232 may be a server EHR (collectively, "the EHR"). The EHR is configured to assist healthcare workers with providing care to patients. EHRs are configured with functionality pertaining to patient intake, patient billing, insurance billing, prescription generation, maintaining a record of patient care over time, etc. EHRs are often used by healthcare workers at the point of care (i.e., at a time when the healthcare worker is providing care to a patient). For example, a healthcare worker may retrieve data from a patient record maintained by an EHR to relatively quickly ascertain problems being experienced by the patient, medications currently being taken by the patient, and so forth. In the embodiment, the automation application 110 may execute a macro which causes the server EHR to perform an action with respect to the patient record. In an embodiment, the automation application 212 can access a client application 210 and copy EHR data from the server application 232, store it, and or paste it into an additional application. Because of the various features disclosed herein, this process can be done with fewer errors and more speed than preexisting technological solutions.

The server computing device 226 may additionally comprise a data store 234. The data store 234 retains application data 236. The application data 236 may take different forms depending on the function of the server application 232. When the server application 232 is a server EHR, the application data 236 may be patient records for patients. When the server application 232 is an ECM system, the application data 236 may comprise documents, records, images, etc.

In an embodiment, the application data 236 may be organized in a database. For instance, the database may be a relational database (e.g., a database that stores the application data 236 in tabular schema of rows and columns) or a nonrelational database (i.e., a database that stores the application data 236 in a format other than rows and columns, such as a database that stores the application data 236 as a key/value pair, as a JavaScript Object Notation (JSON) document, or as a graph).

Although not shown in FIG. 2, it is to be understood that some of the functionality of the automation application 212 may be implemented on a server automation application (not shown) that executes on the server computing device 226.

Operation of the computing system 200 is now set forth. The automation application 212 may generate the macro 216 using a similar or identical process to that described above in the description of FIG. 1. Alternatively, the client computing device 202 may receive the macro 216 from another computing device (e.g., the computing device 100). The automation application 212 then executes the macro 216. In an example, the automation application 212 may execute the macro responsive to receiving input from a user of the client computing device 202. In another example, the automation application 212 may execute the macro at a predefined time interval (e.g., once a day, once an hour).

Similar to the process described above in the description of FIG. 1, executing the macro causes the automation application 212 to mimic the sequence of inputs to the client application 210, thereby causing the client application 210 to perform an action (or more than one action). For instance, the sequence of inputs defined by the macro may cause the client application 210 to generate a query and to transmit the query to the server application 232. The server application 232 may then execute the query against the application data 236 in order to retrieve a subset of the application data 236. The server application 232 then transmits the subset of the application data 236 to the client application 210 (or to another application executing on another computing device).

Prior to or concurrently with executing macro 216, the automation application 212 determines characteristics of the display 218 and accessibility characteristics of the operating system 208. For instance, the automation application 212 may determine a size of the display 218, a resolution of the display 218, an aspect ratio of the display 218, and a font size or a font type in which text is to be presented within a GUI for the client application 210. The automation application 212 may then translate positions of inputs in the sequence of inputs as defined in the macro to second positions with respect to the display 218. For example, if a first input in the sequence of inputs occurred at a first position on the display 122 of the computing device 100, but the display 218 has a different size, resolution, and/or aspect ratio, the automation application 212 may translate the first position to a corresponding second position on the display 218 of the client computing device 202. The automation application 212 may then mimic the first input to the client application 210 at the second position on the display 218.

The above-described technologies present various advantages over conventional technologies. First, unlike conventional macros, the above-described technologies are adaptable to computing devices with varying characteristics, such as varying display resolutions, varying font sizes, and/or varying aspect ratios. Second, unlike conventional macros, the automation application described above has the ability to correlate the sequence of inputs with screen states and operating system processes in order to efficiently execute a macro. By maintaining both an order of the sequence of inputs and timestamps for the sequence of inputs, the automation application avoids performance delays associated with conventional macro applications. Third, unlike techniques that employ specialized programming tools, the above-described technologies may be readily employed by users that lack programming knowledge.

In an embodiment, the automation application 110 and/or the automation application 212 may be configured with an API. As such, a second application (not shown) may perform a programmatic call using the API in order to cause the automation application 212 to execute the macro.

Figure 3:
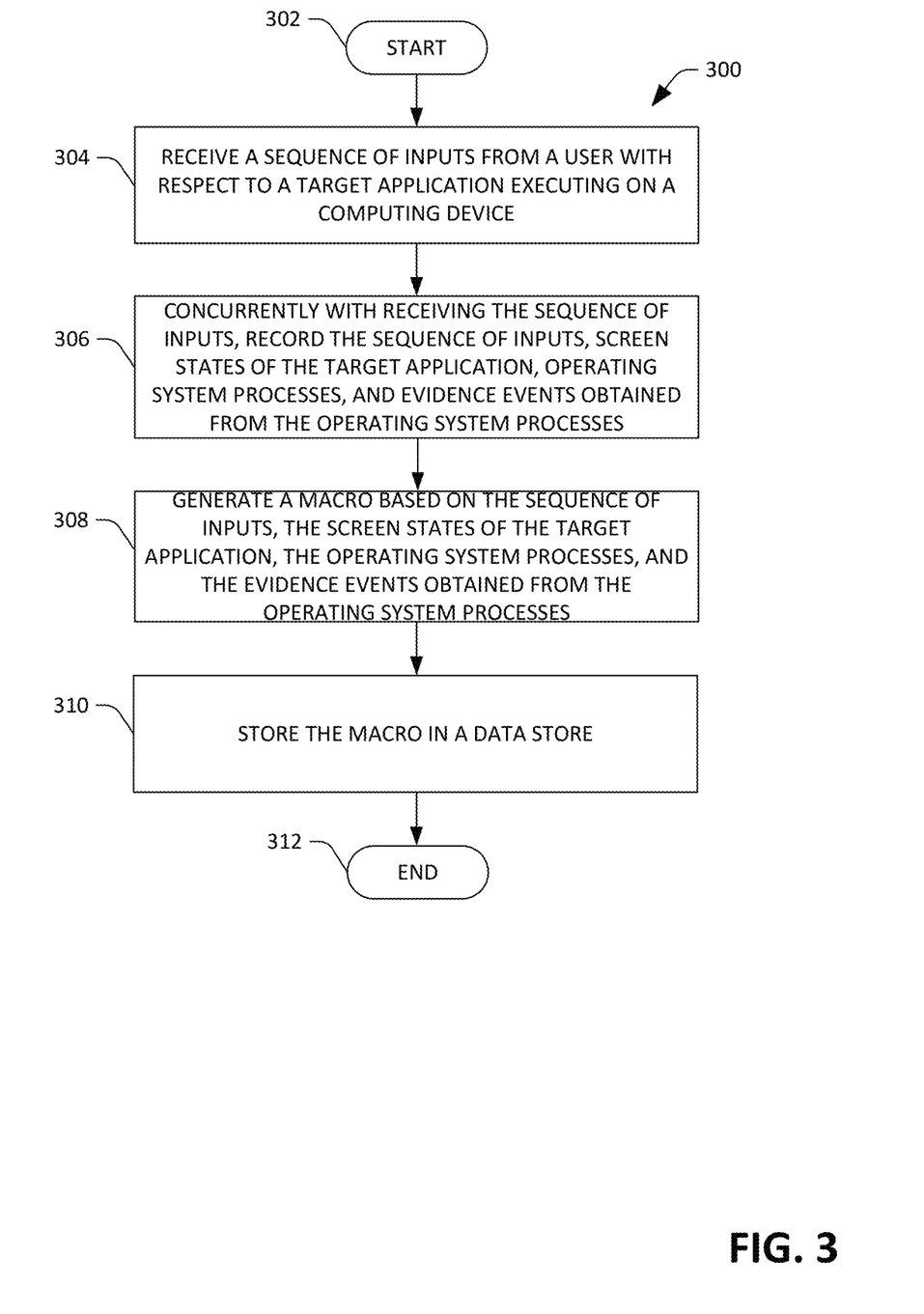
FIG. 3 is a flow diagram that illustrates an exemplary methodology executed by a computing device for generating a macro for a target application.
Figure 4:
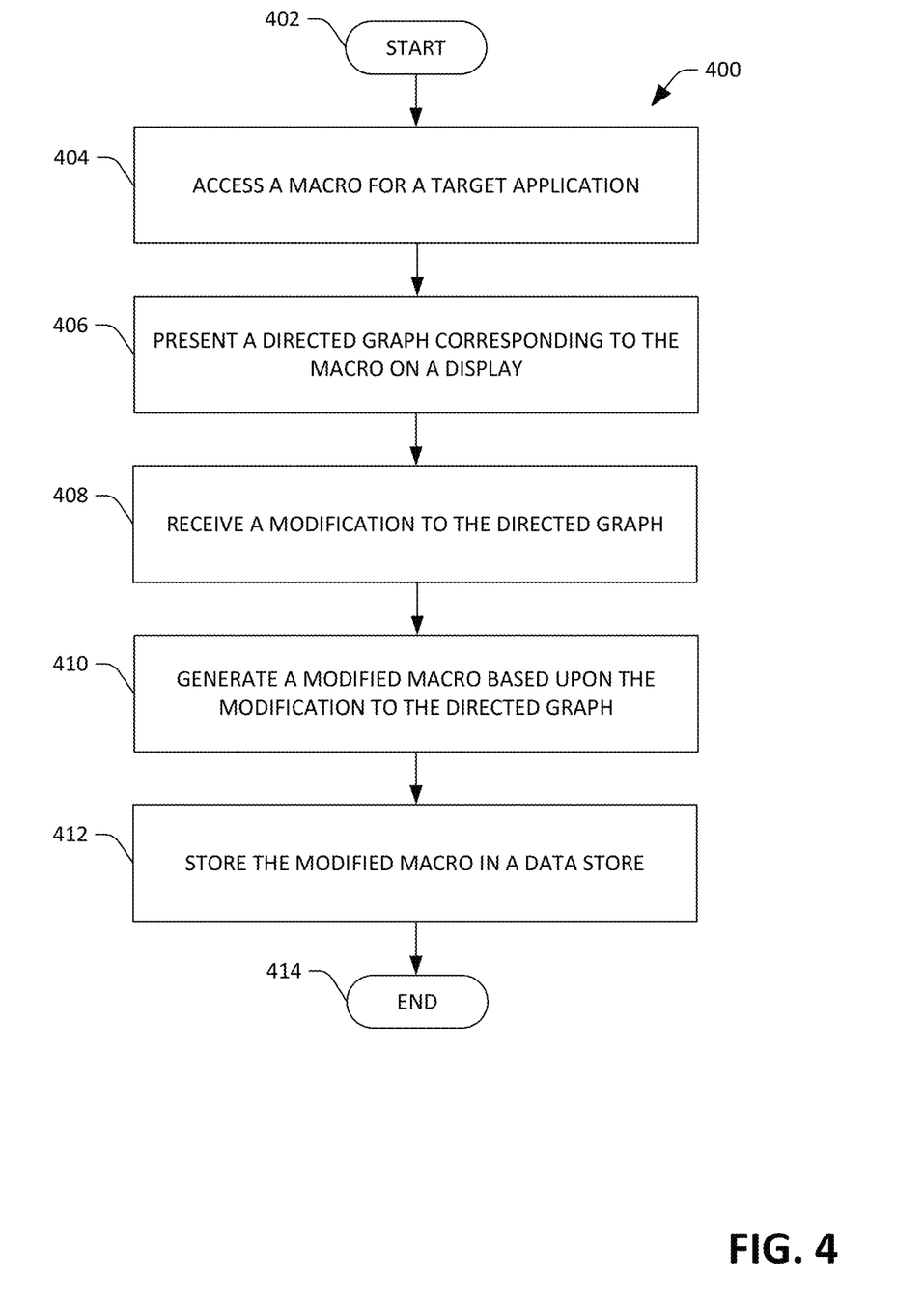
FIG. 4 is a flow diagram that illustrates an exemplary methodology executed by a computing device for modifying a macro for a target application.
Figure 5:
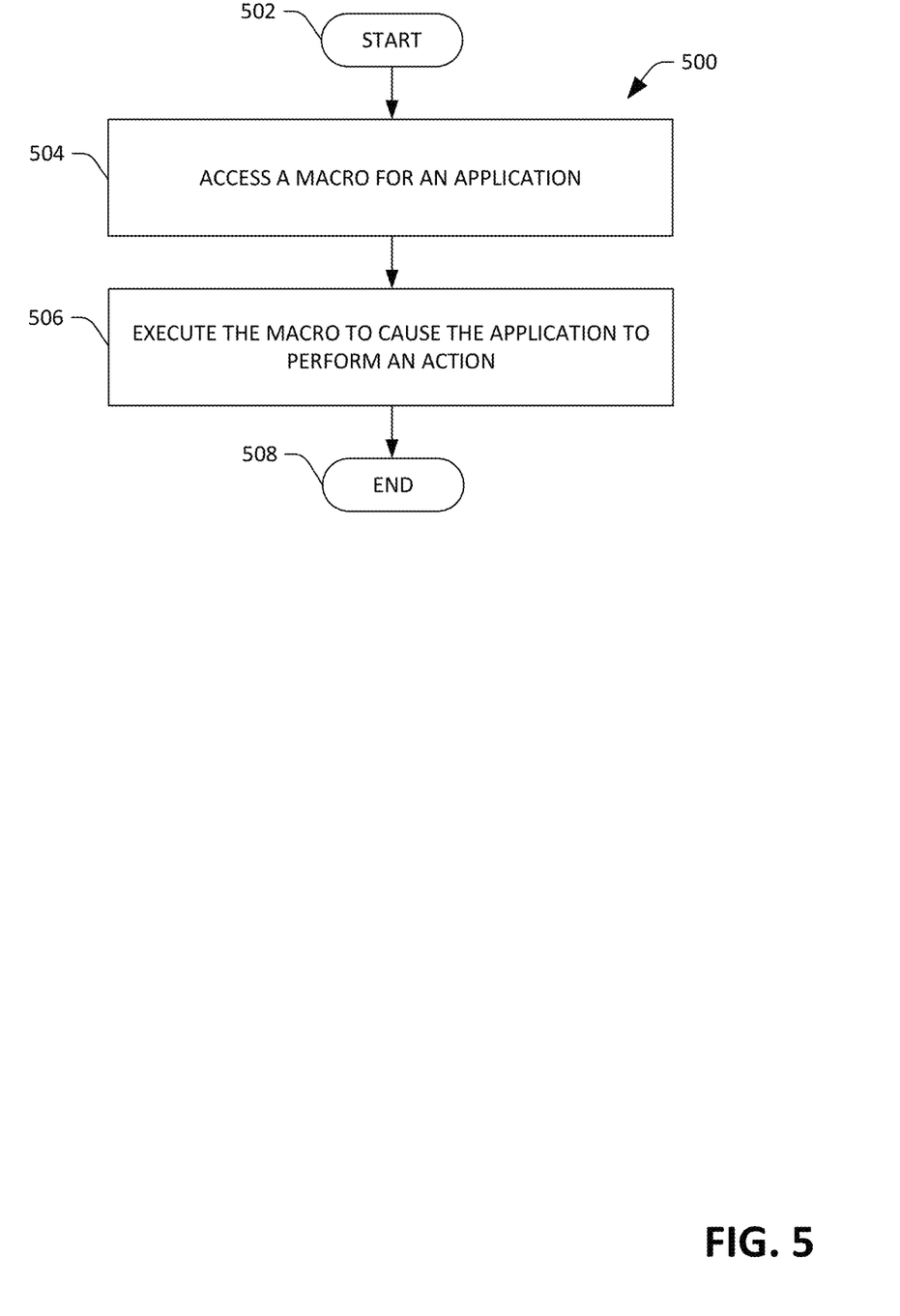
FIG. 5 is a flow diagram that illustrates an exemplary methodology executed by a computing device for executing a macro for a target application.

FIGS. 3-5 illustrate exemplary methodologies relating to macros. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 performed by a computing device that facilitates generating a macro for a target application is illustrated. The methodology 300 begins at 302, and at 304, the computing device receives a sequence of inputs from a user with respect to the target application executing on the computing device. The sequence of inputs causes the target application to perform an action. At 306, concurrently with receiving the sequence of inputs, the computing device records the sequence of inputs, screen states of the target application, operating system processes performed by an operating system executing on the computing device, and evidence events obtained from the operating system processes. At 308, the computing device generates a macro for the target application based upon the sequence of inputs received by the target application, the screen states of the target application as the target application receives the sequence of inputs, the operating systems processes, and the evidence events. At 310, the computing device stores the macro in a data store. The methodology 300 concludes at 312.

With reference now to FIG. 4, a methodology 400 performed by a computing device that facilitates modifying a macro is illustrated. The methodology 400 begins at 402, and at 404, the computing device accesses a macro for a target application. The macro has been generated based upon a sequence of inputs from a user received by the application, screen states of the target application as the target application receives the sequence of inputs from the user, operating system processes that are performed by an operating system as the target application receives the sequence of inputs from the user, and evidence events obtained from the operating system processes. At 406, the computing device presents a directed graph corresponding to the macro on a display of the computing device. The directed graph comprises nodes and directed edges. A first subset of the nodes are assigned to the sequence of inputs. A second subset of the nodes are assigned to potential inputs that were not included in the sequence of inputs. Each directed edge connects a node in the first subset to another node in the first subset. Each directed edge is assigned criteria that are to be satisfied in order to traverse each directed edge. The criteria are based upon the sequence of inputs, the screen states, the operating system processes, and the evidence events.

At 408, the computing device receives a modification to the directed graph from the user. The modification to the directed graph causes a change in an order in which the sequence of inputs is executed, an additional input to be included in the sequence of inputs, or an input to be removed from the sequence of inputs. At 410, the computing device generates a modified macro for the target application based upon the modification to the directed graph. At 412, the computing device stores the modified macro in a data store. The methodology 400 concludes at 414.

Turning now to FIG. 5, a methodology 500 performed by a computing device that facilitates executing a macro for a target application is illustrated. The methodology 500 begins at 502, and at 504, the computing device accesses the macro for the target application. The macro has been generated by an automation application based upon a sequence of inputs from a user received by the target application, screen states of the target application as the target application receives the sequence of inputs from the user, operating systems processes that are performed by an operating system as the target application receives the sequence of inputs from the user, and evidence events that are obtained from the operating system processes. At 506, the computing device executes the macro. Executing the macro causes the automation application to mimic the sequence of inputs to the target application, thereby causing the target application to perform an action. The methodology 500 concludes at 508.

Figure 6:
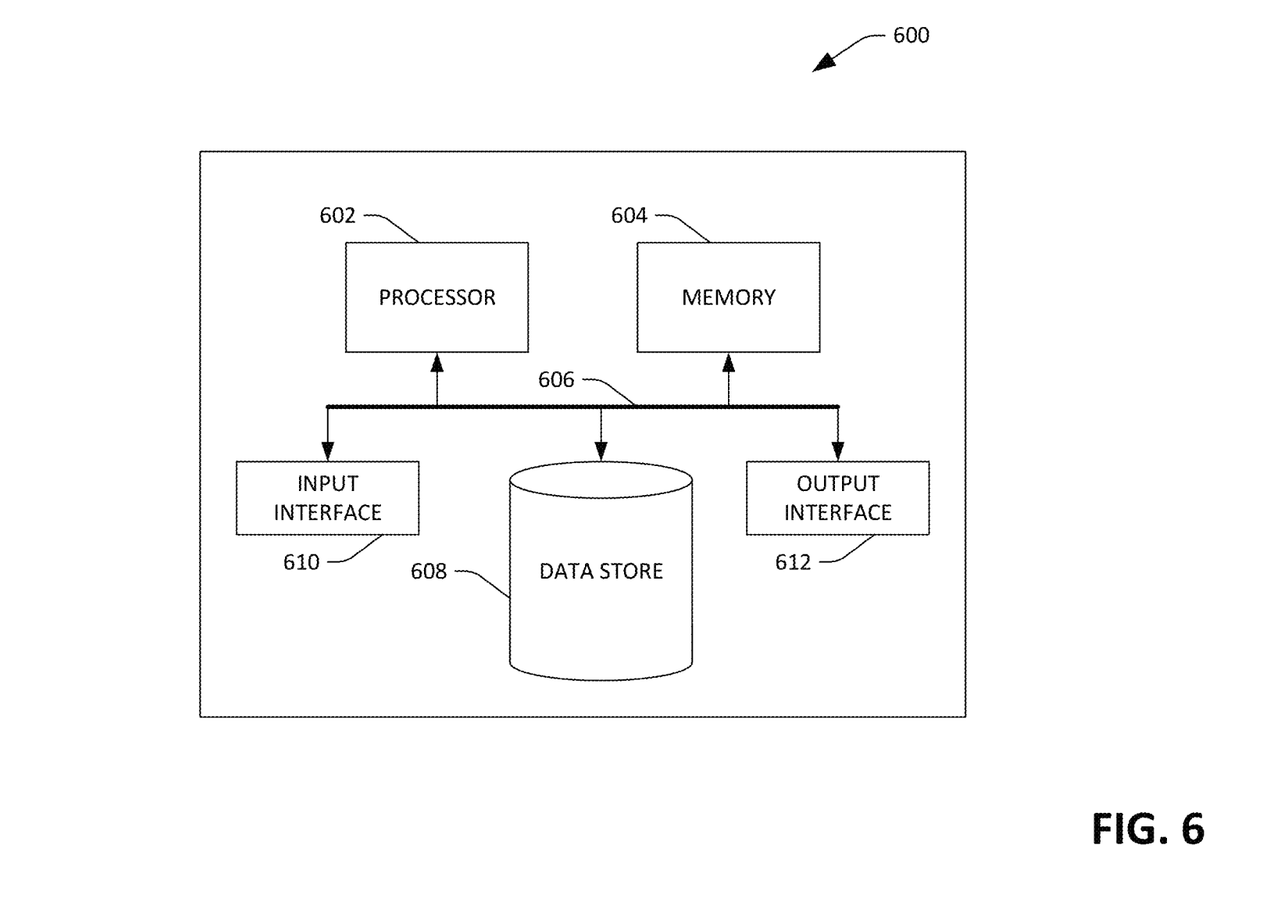
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that generates a macro. By way of another example, the computing device 600 can be used in a system that executes a macro. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store macros, screen states, directed graphs, application data, etc.

The computing device 600 additionally includes a data store 608 that is accessible by the processor 602 by way of the system bus 606. The data store 608 may include executable instructions, macros, screen states, directed graphs, application data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
    a processor; and
    memory storing an automation application, wherein the automation application, when executed by the processor, causes the processor to perform acts comprising:
        accessing a macro for a target application, wherein the macro has been generated based upon:
            a sequence of inputs from a user received by the target application, wherein the sequence of inputs causes the target application to perform an action;
            screen states of the target application as the target application receives the sequence of inputs from the user;
            operating system processes that are performed by an operating system as the target application receives the sequence of inputs from the user; and
            evidence events representing information obtained from the operating system processes; and
        executing the macro, wherein executing the macro causes the automation application to mimic the sequence of inputs to the target application, thereby causing the target application to perform the action, and further wherein mimicking the sequence of inputs is conditioned upon observing the screen states, the operating system processes, and the evidence events as the macro is being executed.

2. The computing device of claim 1, wherein the computing device is in network communication with a server computing device that executes a server enterprise content management (ECM) application, wherein the action comprises transmitting data to the server ECM application, wherein the data causes the server ECM application to perform a second action.

3. The computing device of claim 1, wherein the computing device is in network communication with a server computing device that executes a server application, wherein the action comprises transmitting data to the server application, wherein the data causes the server application to perform a second action.

4. The computing device of claim 1, wherein the operating system processes include at least one of:
    operating system hook functions;
    operating system message events;
    operating system automation processes; or
    command line emulation protocol responses.

5. The computing device of claim 1, wherein the evidence events include at least one of:
    text written to a graphical user interface (GUI) of the target application;
    positioning data indicating a change of position of an element of the GUI;
    text representing an internal name of a control of the GUI;
    text available from an emulation protocol response;
    opening of a window; or
    closing of the window.

6. The computing device of claim 1, wherein the sequence of inputs includes at least one of:
    receipt of an input on a touchscreen;
    a depression of a trackpad;
    a single click of a mouse button of a mouse;
    a double click of the mouse button of the mouse;
    a depression of the mouse button of the mouse, followed by a drag of the mouse in a direction, followed by a release of the mouse button;
    audible words that are provided to a voice-to-text application;
    a rotation of a scroll wheel of the mouse; or
    a keyboard stroke.

7. The computing device of claim 1, wherein the macro is generated by an instance of the automation application executed on a second computing device, wherein the second computing device is operated by the user, the acts further comprising:
    prior to accessing the macro for the target application, receiving the macro from the second computing device.

8. The computing device of claim 1, wherein the macro includes a directed graph comprising nodes and directed edges, wherein the nodes comprise a first subset of nodes and a second subset of nodes, wherein the first subset is assigned to the sequence of inputs, wherein the second subset is assigned to potential inputs not included in the sequence of inputs, wherein the directed edges connect the first subset, wherein each directed edge in the directed edges is assigned criteria that are to be satisfied in order to traverse each directed edge, wherein the criteria are based upon the sequence of inputs, the screen states, the operating system processes, and the evidence events, wherein the automation application executes the macro in part by traversing the directed graph.

9. The computing device of claim 8, wherein the criteria include at least one of:
    evaluating text located in a screen state in the screen states against a constant text value;
    evaluating a position of the text in the screen state against a constant set of coordinates in the screen state;
    evaluating the position of the text in the screen state against a variable set of coordinates in the screen state;
    evaluating the text in the screen state against a data element;
    evaluating the text in the screen state against an expression;
    evaluating the text in the screen state against second text in a prior screen state in the screen states; or
    evaluating the text in the screen state against second text located in the screen state.

10. The computing device of claim 8, wherein the automation application receives a modification to the directed graph, wherein the modification causes at least one of:
    an addition or a deletion of a node to the directed graph;
    an addition or a deletion of a directed edge in the directed edges;
    the directed edge to originate from a second node in the graph; or
    the directed edge to terminate into the second node, wherein the modification is indicative of a second sequence of inputs that is different from the sequence of inputs, wherein the automation application generates a modified macro based upon the modification to the directed graph, wherein the modified macro, when executed by the automation application, causes the automation application to mimic the second sequence of inputs to the target application.

11. The computing device of claim 1, wherein the action comprises at least one of:
    generating data based at least in part upon the sequence of inputs;
    modifying the data based at least in part upon the sequence of inputs;
    transmitting the data to a second computing device based at least in part upon the sequence of inputs; or receiving the data from the second computing device based at least in part upon the sequence of inputs.

12. The computing device of claim 1, wherein a screen state in the screen states comprises:
    a screenshot of the target application when or before the target application receives an input in the sequence of inputs;
    characteristics of a display that is displaying the target application when or before the target application receives the input in the sequence of inputs; and
    a font size of text that is being displayed by the target application when or before the target application receives the input in the sequence of inputs.

13. A method executed by a processor of a computing device when the processor executes an automation application, the method comprising:
    generating a macro for a target application that is executed on the computing device, wherein the macro is generated based upon:
        a sequence of inputs from a user received by the target application, wherein the sequence of inputs causes the target application to perform an action;
        screen states of the target application as the target application receives the sequence of inputs from the user;
        operating system processes that are performed by an operating system of the computing device as the target application receives the sequence of inputs from the user; and
        evidence events representing information obtained from the operating system processes;
    storing the macro in a data store that is accessible to the computing device; and
    subsequent to storing the macro in the data store, executing the macro, wherein executing the macro causes the automation application to mimic the sequence of inputs to the target application, thereby causing the target application to perform the action, and further wherein mimicking the sequence of inputs is conditioned upon observing the screen states, the operating system processes, and the evidence events as the macro is being executed.

14. The method of claim 13, wherein the automation application records a position at which each input in the sequence of inputs is received in a window for the target application that is shown on a display of the computing device.

15. The method of claim 13, wherein generating the macro comprises generating a directed graph comprising nodes and directed edges, wherein the nodes comprise a first subset of nodes and a second subset of nodes, wherein the first subset is assigned to the sequence of inputs, wherein the second subset is assigned to potential inputs not included in the sequence of inputs, wherein the directed edges connect the first subset, wherein each directed edge in the directed edges is assigned criteria that are to be satisfied in order to traverse each directed edge, wherein the criteria are based upon the sequence of inputs, the screen states, the operating system processes, and the evidence events, wherein executing the macro is based in part upon the automation application traversing the directed graph.

16. The method of claim 13, further comprising:
    prior to generating the macro, receiving a first indication from the user that the automation application is to begin recording the sequence of inputs, wherein the first indication causes the automation application to record each input in the sequence of inputs as the target application receives each input in the sequence of inputs; and
    receiving a second indication from the user that the automation application is to cease recording the sequence of inputs, wherein the second indication causes the automation application to cease recording the sequence of inputs, wherein the automation application generates the macro responsive to receiving the second indication.

17. The method of claim 13, further comprising:
    subsequent to generating the macro, transmitting the macro to a second computing device, wherein an instance of the automation application executing on the second computing device executes the macro, wherein executing the macro on the second computing device causes the instance of the automation application to mimic the sequence of inputs to an instance of the target application executing on the second computing device, thereby causing the instance of the target application to perform the action.

18. The method of claim 13, wherein the computing device is in network communication with a server computing device that executes a server electronic health records application (EHR), wherein the application is a client EHR, wherein the action comprises causing the server EHR to perform the action on patient records of a patient.

19. The method of claim 13, wherein the sequence of inputs comprises a first input and a second input, wherein the automation application records a first timestamp when the target application receives the first input, wherein the automation application records a second timestamp when the target application receives the second input, wherein the first timestamp is associated with the first input, a first screen state when the first input is received, first operating system processes performed when the first input is received, and first evidence events associated with the first input, wherein the second timestamp is associated with the second input, a second screen state when second input is received, second operating system processes performed when the second input is received, and second evidence events associated with the second input, wherein generating the macro is based in part upon the first timestamp and the second timestamp.

20. A computing device comprising:
    a processor; and
    memory storing an automation application, wherein the automation application, when executed by the processor, causes the processor to perform acts comprising:
        accessing a macro for a target application, wherein the macro has been generated based upon a sequence of inputs from a user received by the target application, wherein the sequence of inputs causes the target application to perform an action, wherein the macro includes a directed graph comprising nodes and directed edges, the nodes comprising a first subset of nodes and a second subset of nodes, wherein the first subset of the nodes are assigned to the sequence of inputs, wherein the second subset of the nodes are assigned to potential inputs to the target application, wherein the directed edges connect the first subset of the nodes, wherein each directed edge in the directed edges is assigned criteria that are to be satisfied in order to traverse each directed edge; and
        executing the macro, wherein executing the macro causes the automation application to mimic the sequence of inputs to the target application by traversing the first subset of nodes in the directed graph via the directed edges connecting the first subset of the nodes.

* * * * *